United States Patent [19]

Tsou et al.

[11] Patent Number: 5,315,303
[45] Date of Patent: May 24, 1994

[54] COMPACT, FLEXIBLE AND INTEGRATED MILLIMETER WAVE RADAR SENSOR

[75] Inventors: Hsi-Shen E. Tsou, Rancho Palos Verdes; Catherine L. Im, Torrance; Gregory A. Shreve, Torrance; Martin M. LaCon, Torrance, all of Calif.

[73] Assignee: TRW Inc., Redondo Beach, Calif.

[21] Appl. No.: 767,953

[22] Filed: Sep. 30, 1991

[51] Int. Cl.[5] .................................................. G01S 13/04
[52] U.S. Cl. ..................................... 342/27; 342/200
[58] Field of Search ......................... 342/27, 128, 200

[56] References Cited

U.S. PATENT DOCUMENTS

| | | | |
|---|---|---|---|
| 4,277,763 | 7/1981 | Ward, Jr. | 342/200 X |
| 4,893,126 | 1/1990 | Evans | 342/175 |
| 5,008,678 | 4/1991 | Herman | 342/158 |
| 5,072,223 | 12/1991 | Hethuin et al. | 342/128 X |

Primary Examiner—T. H. Tubbesing
Attorney, Agent, or Firm—G. Gregory Schivley

[57] ABSTRACT

A compact radar sensor is provided. A monolithic millimeter wave integrated circuit (MMIC) transceiver is provided having a transmitter for transmitting a frequency modulated signal and a receiver for receiving reflected signals thereof. A microstrip patch antenna is provided for transmitting signals within a desired field and receiving the reflected signals from objects therein. A digital signal processor is further provided for analyzing the received signal and providing output signals therefrom.

17 Claims, 5 Drawing Sheets

COMPACT, FLEXIBLE AND INTEGRATED MILLIMETER WAVE RADAR SENSOR

BACKGROUND OF THE INVENTION

1. Technical Field

This invention relates to radar sensors and, more particularly, to a compact, flexible, and integrated millimeter wave radar sensor.

2. Discussion

Radar sensors are generally employed for detecting objects within a desired field. Typical sensing systems have been developed which employ radar, laser, infrared (IR), or ultrasonic principles. However, each of these systems has its drawbacks. Current radar sensors operate at frequencies which are too low to incorporate the advanced monolithic millimeter wave integrated circuit (MMIC) and compact patch antenna technology. Generally, these sensing units are bulky and difficult to integrate into a host system. In addition, current radar sensing units require a large number of components which make the units costly. As a result, these systems are limited in modularity and flexibility, and therefore, applications. Typical Laser sensors generally suffer from high cost, in addition to potential health hazards. Furthermore, they are limited by environmental conditions such as fog and smoke. Infrared and ultrasonic sensors have limitations which include sensitivity to environmental interferences, as well as interference from other similar sources, in addition to noise.

There is a need for an effective compact, flexible and integrated radar sensor that can be easily integrated into many systems for various applications. In particular, there exists a need for a compact, low cost, flexible radar sensor for automotive and space and defense-related applications and the like. Such applications may include integrating such a radar sensor onto an automotive vehicle to provide a blind spot detector for crash avoidance purposes. For advanced vehicle designs, such as those involving four-wheel drive functions, there is a need for a smart sensor to determine the true ground speed of the vehicle for cruise control purposes, accurate vehicle speed measurement, and four-wheel steering. In addition, there exists a need for a smart sensor to determine the vehicle height and to project the road surface ahead for advanced adaptive suspension systems. Furthermore, for military applications, there exists a need for a compact, modular, low cost sensor for collision avoidance of armored vehicles, heavy robotic equipment and all types of transportation equipment during night operations and under adverse conditions such as fog and battle field smoke.

Sensor systems have been developed and provided for such applications. Typical systems have generally employed radar, laser, infrared, and ultrasonic sensors. However, these systems have not been widely deployed because of high cost, poor performance excessive size, and limited flexibility.

It is therefore desirable to obtain an effective, low cost, compact and safe to operate radar sensor. It is further desirable to obtain such a radar sensor which can be easily integrated into various systems. Such a system may include an automotive vehicle for providing a blind spot detector, a true ground speed measuring device, a vehicle height measurement device, and other various applications.

SUMMARY OF THE INVENTION

In accordance with the teachings of the present invention, a compact, low cost, modular and flexible millimeter wave radar sensor is provided. The sensor includes a monolithic millimeter wave integrated circuit (MMIC) transceiver having a transmitter for transmitting a frequency modulated carrier signal and a receiver for receiving the reflected signal. A microstrip patch antenna is provided for transmitting and receiving the signals within a desired field. A digital signal processor further receives and analyzes the signals.

BRIEF DESCRIPTION OF THE DRAWINGS

The various advantages of the present invention will become apparent to those skilled in the art by reading the following specification and by reference to the following drawings in which.

DETAILED DESCRIPTION OF THE PREFERRED EMBODIMENT

Figure 1:
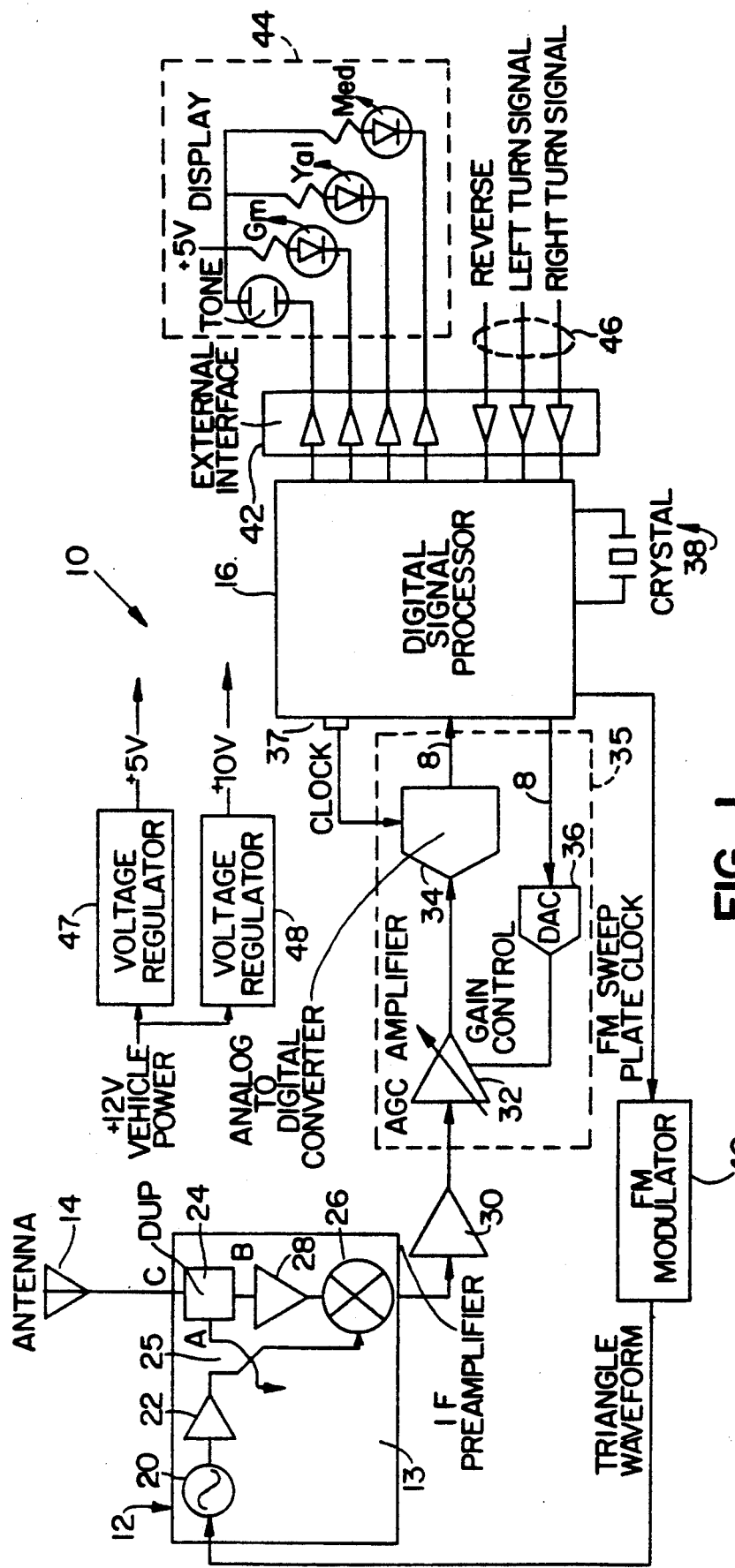
FIG. 1 is a schematic block diagram which illustrates a compact millimeter wave radar sensor in accordance with the present invention.

Turning now to FIG. 1, a schematic block diagram is shown therein which illustrates a compact millimeter wave (MMW) radar sensor 10 in accordance with the present invention. Radar sensor 10 employs a monolithic millimeter wave integrated circuit (MMIC) transceiver 12. The transceiver 12 provides MMW transmit and receive functions which are integrated onto a single monolithic chip 13 using standard photolithographic techniques known in the art. Transceiver 12 includes a voltage controlled oscillator (VCO) 20 which is connected to an amplifier 22. Amplifier 22 is further connected to a coupler 25 which is connected to port A of a duplexer 24. A pre-amplifier 28 is connected to port B of duplexer 24 for amplifying a reflected signal received by antenna 14. A balanced mixer 26 is provided which has an input connected to the output of pre-amplifier 28. Balanced mixer 26 is further adapted to receive a leakage signal which is the result of the coupler 25 output of the transmitted signal generated by the voltage controlled oscillator 20 and the transmit amplifier 22. Balanced mixer 26 is adapted to provide the difference between the transmit signal and the reflected signal. The output of balanced mixer 26 is an intermediate frequency (IF) known as the beat frequency which contains the range information. In an alternate embodiment, duplexer 24 and coupler 25 may be removed and replaced with a simple coupler to allow for further cost savings and smaller size.

A microstrip patch antenna 14 is connected to port C of duplexer 24. The antenna 14 is adapted to transmit a high frequency modulated carrier signal throughout a desired field to be monitored. This transmitted signal may have a frequency of around 35 to 94 GHz. A higher frequency signal may also be employed. Antenna 14 is further adapted to receive a reflected signal which is the result of the transmitted signal reflecting off of objects located within the field.

An IF pre-amplifier 30 is connected to the output of the balanced mixer 26 for amplifying the IF output signal therefrom. Connected to the output of IF pre-amplifier 30 is an automatic gain control amplifier 32 which provides high dynamic range. An analog-to-digital converter 34 is connected to the output of the automatic gain control amplifier 32 for receiving a signal therefrom. The analog-to-digital converter 34 is further adapted to receive a clock signal from clock 37 of digital signal processor 16 and provide a digital output to the digital signal processor 16. Analog-to-digital converter 34 is a standard off-the-shelf 8-bit converter and is capable of handling IF signals and providing a dynamic range of about 48 dB. A digital-to-analog converter 36 is further connected to digital signal processor 16 for receiving an input signal therefrom. The digital-to-analog converter 36 is adapted to provide a gain control signal to the automatic gain control amplifier 32 which provides a dynamic range of about 50 dB. The automatic gain control amplifier 32 in combination with the analog-to-digital converter 34, the digital signal processor 16, and the digital-to-analog converter 36 make up a dynamic range adjustment control loop 35. Control loop 35 provides for the dynamic range required to process the variations in target reflections and the range of distance desired.

An FM modulator 40 is connected to digital signal processor 16 for receiving a square wave signal therefrom. FM modulator 40 is configured for providing a triangular modulation waveform signal at the same periodicity as the square waveform. The output of FM modulator 40 is connected to the input of the voltage controlled oscillator 20 of transceiver 12 for providing the frequency modulated signal thereto.

Digital signal processor 16 is further connected to an external interface 42. External interface 42 provides connection to an output display 44 and input terminals 46. Digital signal processor 16 is manufactured by AT&T and has a model number DSP16. Other suitable digital signal processors such as a Motorola 56001 and Texas Instruments TMS320C15 may also be used. Digital signal processor 16 performs all the necessary processing and embedded intelligence functions therein. Processor 16 includes processing capabilities for providing digital filtering, integrations and various other processing functions. In essence, digital signal processor 16 is adapted to provide control signals and detect any reflected signal from objects within the field being monitored and provide output responses therefrom. From the frequency shift and other information, the digital signal processor 16 provides the distance information.

A compact voltage regulator 47 provides the +5 v dc supply from a 12 v dc supply. Another compact voltage regulator 48 provides the +10 v dc supply from the 12 v dc supply. In a different embodiment, different voltage regulators may be used to provide the +5 v and +10 v dc from other voltage sources.

Figure 2A:
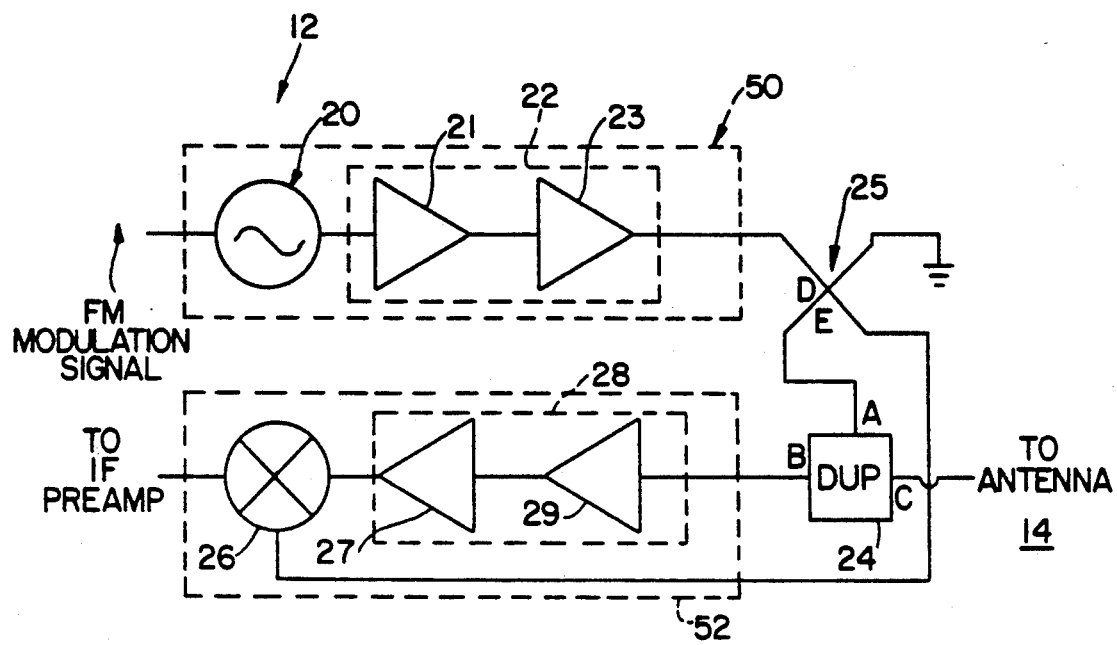
FIG. 2a is a block diagram which illustrates a monolithic millimeter wave integrated circuit (MMIC) transceiver.

FIG. 2a is a block diagram which illustrates one embodiment of the monolithic millimeter wave integrated circuit (MMIC) transceiver 12. Transceiver 12 includes a voltage-controlled oscillator (VCO) 20 adapted to receive the FM modulation signal from FM modulator 40 and provide a frequency modulated carrier signal therefrom. Voltage controlled oscillator 20 includes a single high electron mobility transistor (HEMT) and an associated tank circuit for providing the carrier signal. The voltage controlled oscillator 20 is modulated by applying a voltage to a varactor located in an oscillator tank circuit. Connected to the output of the voltage controlled oscillator 20 is a two-stage amplifier 22 having a first amplifier stage 21 and second amplifier stage 23. Amplifier 22 amplifies the signal which is then transmitted to the antenna 14 through the duplexer 24 and the coupler 25. The output of amplifier 22 is connected to port D of the coupler 25. The port E of the coupler 25 is connected to the port A of the duplexer 24. The transmit output to the antenna 14 is through port C of the duplexer 24. The combination of voltage controlled oscillator 20 in connection with the amplifier 22 forms a transmitter 50.

Transceiver 12 further includes a two-stage pre-amplifier 28 having a first stage 29 and second stage 27. Pre-amplifier 28 is adapted to receive and amplify the reflected signals gathered by the antenna 14. The balanced mixer 26 is connected to the output of the pre-amplifier 28. Together, balanced mixer 26 and the pre-amplifier 28 form the receiver 52. The duplexer 24 and the coupler 25 form a network for isolating the transmitter 50 from the receiver 52. The coupler 25 provides the reference transmit signal path to the mixer 26 of the receiver 52 and the transmit path to duplexer 24 and antenna 14. The balanced mixer 26 provides the difference between the reference signal and the reflected signal to obtain an intermediate frequency (IF) known as the beat frequency. The resulting beat frequency contains the difference in frequency between the two signals.

Figure 2B:
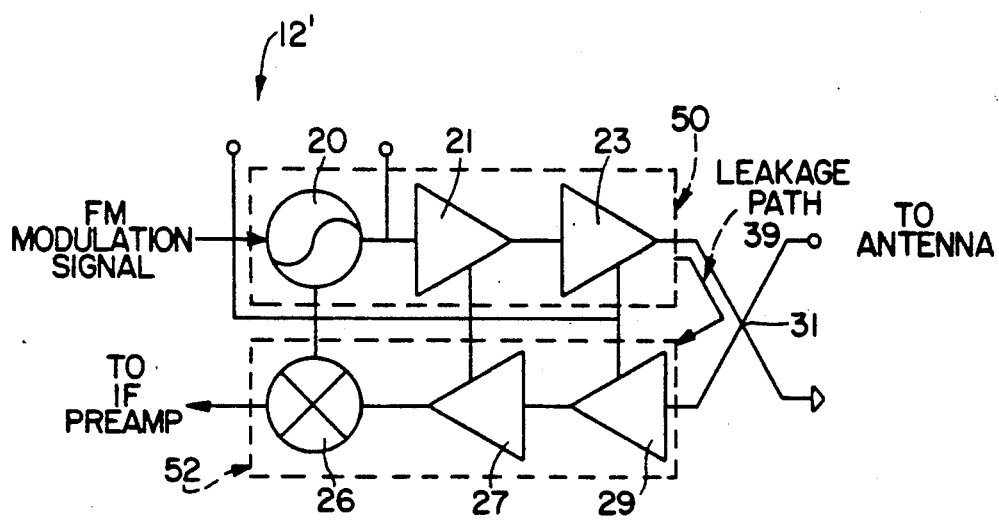
FIG. 2b is a block diagram which illustrates an alternate embodiment of a monolithic millimeter wave integrated circuit (MMIC) transceiver.

In an alternate embodiment of the MMIC transceiver 12' as shown in FIG. 2b, the duplexer 24 and the coupler 25 of the original implementation as shown in FIG. 2a are replaced with a simple coupler 31 to allow for further cost savings and smaller size of the MMIC transceiver. The voltage controlled oscillator 20 and the two-stage transmit amplifier 21 and 23 are basically the same as in the original transmitter except in chip layout. The two-stage amplifier 27 and 29, and the balanced mixer 26 are similar to the original embodiment, except in chip layout and in that the balanced mixer 26 is further adapted to receive a leakage transmit signal which is used as the reference signal. The leakage signal is the result of the signal generated by the voltage controlled oscillator 20 being transmitted across a leakage path 39 from amplifier 23 to amplifier 29 across the new coupler 31. This alternate embodiment of the MMIC transceiver advantageously utilizes this leakage signal while providing isolation between the transmitter 50 and the receiver 52.

Figure 3:
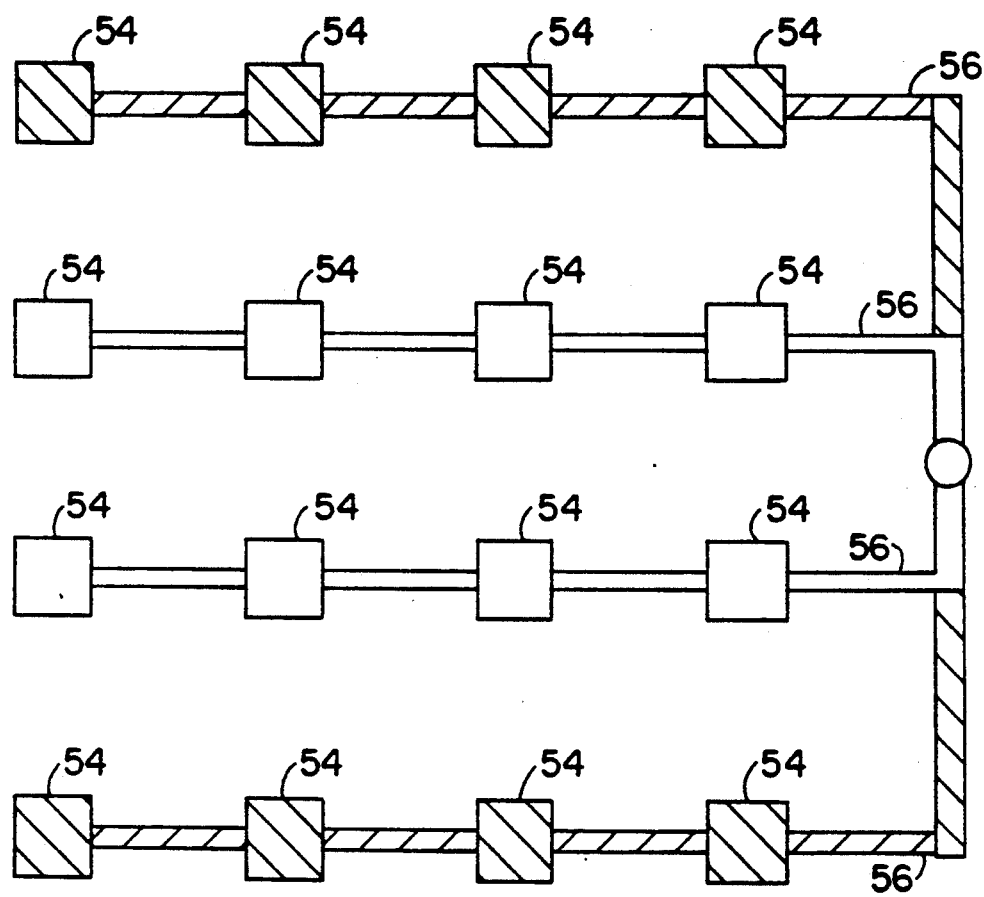
FIG. 3 is a schematic diagram which illustrates a millimeter wave band microstrip patch antenna design example.

FIG. 3 illustrates a design example of a millimeter wave band microstrip patch antenna 14. A plurality of radiating/receiving microstrip patches 54 are provided in a 4×4 array. In alternate embodiments, a 4×2 and a 4×1 array may also be used. Microstrip patches 54 are connected by microstrip feed lines 56. The antenna 14 is adapted to be etched on a printed circuit board and may be adapted to provide for a plurality of such microstrip patches 54 in various array designs. The array design essentially determines the beam shape which may be adapted to provide for various coverage requirements for different applications. The resulting antenna 14 is small and planar, and has a patch pattern that can easily be changed to adapt to various applications and mounting requirements. For automotive applications, the planar antenna enables incorporation of the radar sensor in the tail light assembly, side mirror assembly, or rear bumper of a vehicle. The particular antenna design example shown therein provides for an overall size which is less than 1.5 inches by 1.5 inches. However, various shapes and sizes may be used, depending on the particular application.

Figure 4:
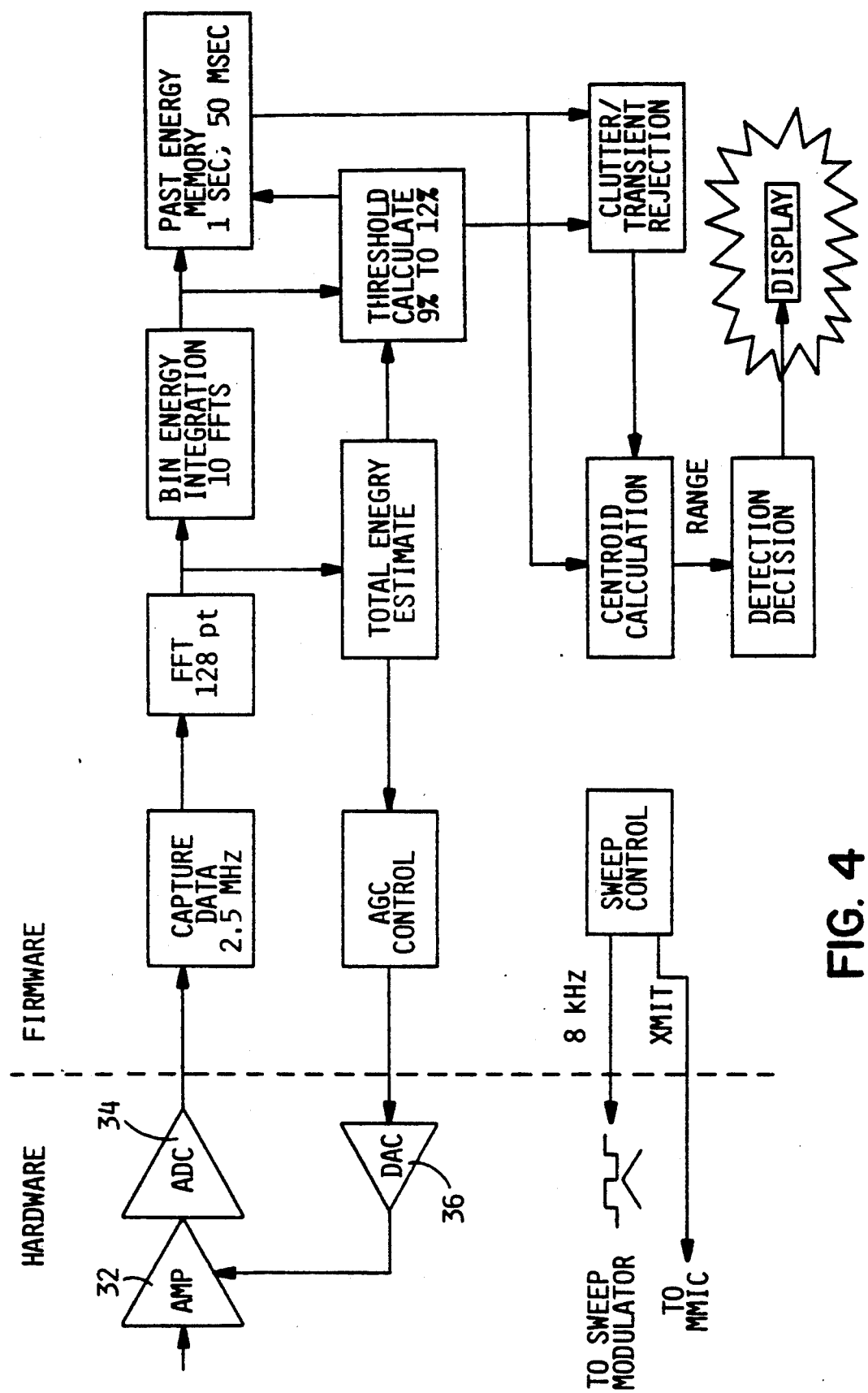
FIG. 4 is a block diagram which illustrates the major functions of a digital signal processor in accordance with the present invention.
Figure 5A:
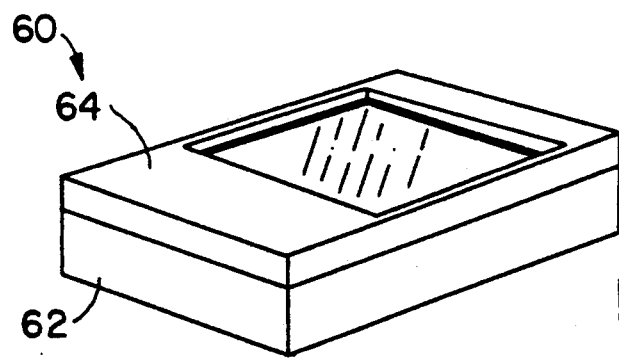
FIGS. 5(a-d) are assembly views of a compact radar sensor module example.
Figure 5B:
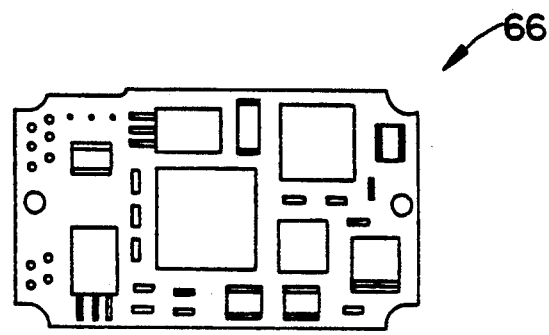
Figure 5C:
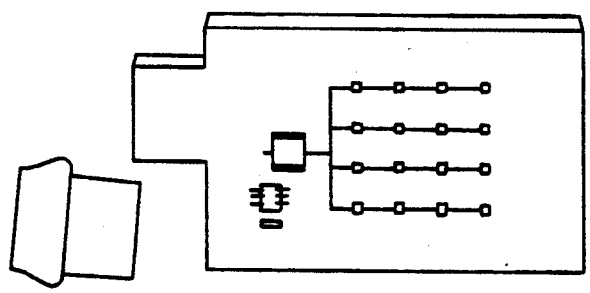
Figure 5D:
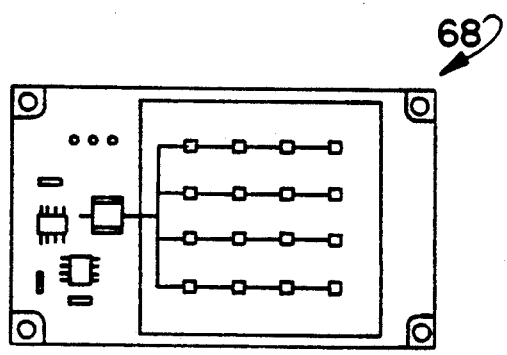

FIG. 4 is a block diagram which illustrates the major functions of the digital signal processor 16. The signal processing functions performed by the digital signal processor 16 include digital filtering and integration to remove clutter, reduce false alarms and to increase sensitivity. The embedded intelligence functions include decision logic, control, display, and annunciation control, and self testing. The digital signal processor 16 performs these functions in firmware to achieve the lowest possible recurring costs. The firmware may include software such as machine code fabricated in read-only memory (ROM). The digital signal processor 16 reads the digitized data from the analog-to-digital converter 34 and calculates the gain control that is to be applied to the automatic gain control amplifier 32.

In operation, the firmware of digital signal processor 16 reads in a complete sweep of the radar data and captures the data at a sampling rate of about 2.5 megahertz. The digital signal processor 16 calculates a fast Fourier transform (FFT). The total energy is estimated from the FFT calculation and used to calculate the gain control signal which is applied to automatic gain control amplifier 32. The transformed data is further divided into range bins in order to detect valid returns. Several sweeps are transformed and accumulated, resulting in a 6 dB processing gain in the signal-to-noise ratio of the received signal. The digital signal processor 16 then weighs the spectrum to reduce the effects of clutter. A threshold decision function is applied to the range bins to detect valid returns. These returns are then compared to several past decisions from previous sweeps. By comparing past returns, the digital signal processor 16 adapts the decision thresholds and clutter weighing functions as the environment changes in order to increase differentiation of valid returns and reject disturbances and spurious returns. The digital signal processor 16 furthermore determines the closest valid return. Finally a periodically updated display provides the decision.

FIGS. 5a-5d illustrate the packaging design for a particular radar sensor example of this invention. A radar sensor module 60 is shown having a housing subassembly 62, a radome/cover 64 and an electronic subassembly having a support plate (not shown) and two printed circuit board assemblies 66 and 68. One of the printed circuit board assemblies 68 is laminated to the top of the support plate and has the patch antenna assembly etched thereon and the MMIC transceiver along with the preamplifier circuit. This assembly is connected by flexible jumper cable to the other multi-layer digital printed circuit board assembly 66 that is mounted to the rear portion of the support plate. This second printed circuit board assembly 66 has components mounted on both sides to minimize the module size. The radome/cover 64 is bonded over the top of the module 60 and provides impact protection as well as a moisture seal for the entire module 60. The invention discussed herein is not restricted to this particular module design, for different applications may require variations thereof.

In view of the foregoing, it can be appreciated that the present invention enables the user to achieve an effective compact, flexible and integrated radar sensor. Thus, while this invention has been described in connection with a particular example thereof, no limitation is intended thereby except as defined by the following claims. This is because the skilled practitioner will realize that other modifications can be made without departing from the spirit of this invention after studying the specification and drawings.

What is claimed is:

1. A compact highly integrated radar system for detecting objects within a desired field, said system comprising:
   transceiver means including a monolithic millimeter wave integrated circuit (MMIC) transceiver having a transmitter for transmitting a frequency modulated (FM) carrier signal and a receiver for receiving reflected signals thereof, said MMIC transceiver having a circuit including oscillation, amplification and signal mixing means and integrated onto a single monolithic chip;
   antenna means coupled to the transceiver means for transmitting said FM carrier signal and receiving said reflected signals within a desired field;
   control means for controlling the dynamic range of said radar system; and
   processor means including a digital signal processor coupled to the transceiver means for analyzing received signals so as to detect the presence of objects within the field.

2. The radar system as defined in claim 1 further comprising a frequency modulator coupled between said digital signal processor and the transceiver circuit, said frequency modulator being adapted to provide a preselected modulation signal to the transceiver.

3. The radar system as defined in claim 2 comprising:
   circuit means for providing intermediate frequency (IF) signals with target information.

4. The radar system as defined in claim 3 wherein said control means comprises:
   an automatic gain control amplifier being adapted to receive an analog gain control signal from said digital signal processor and provide an output therefrom;
   an analog-to-digital converter adapted to digitize the output of said automatic gain control amplifier and provide a digital signal to said digital signal processor; and
   a digital-to-analog converter being adapted to receive a digital gain control signal from the digital signal processor and provide the analog gain control signal.

5. The radar system as defined in claim 1 wherein said transceiver circuit comprises:
   a voltage controlled oscillator being adapted to receive a waveform modulation signal and generate the frequency modulated carrier signal; and
   a first amplifier coupled to said voltage controlled oscillator for amplifying the frequency modulated carrier signal, said voltage controlled oscillator and said first amplifier forming said transmitter for providing the amplified frequency modulated carrier signal to the antenna means.

6. The radar system as defined in claim 5 wherein said transceiver circuit further comprises:

a second amplifier for receiving and amplifying the reflected signals received from said antenna means; and a balanced mixer coupled to said second amplifier for receiving a reference transmit signal representative of said FM carrier signal and mixing the reference transmit signal with the received reflected signals so as to provide the difference therebetween, said second amplifier and said balanced mixer forming said receiver.

7. The radar system as defined in claim 6 wherein said MMIC transceiver further comprises:

a coupler for providing coupling and isolation between the transmitter and receiver and a transmit path to said antenna.

8. The radar system as defined in claim 7 wherein said MMIC transceiver further comprises:

a duplexer coupled between said transmitter and receiver for allowing said transmitted carrier signal to be transmitted from said transmitter to the antenna means, and further allowing the reflected signals to be transmitted from said antenna means to the receiver, said duplexer being further adapted to isolate the transmitter from the receiver, and wherein said reference transmit signal received by said balanced mixer is a leakage signal provided along a leakage path from said transmitter.

9. The radar system as defined in claim 8 wherein said antenna means comprises a microstrip patch antenna, said antenna being etched on a circuit board and including a plurality of patches being connected by microstrip lines.

10. The radar system as defined in claim 9 wherein said radar system is integrated into a small, compact, low profile module providing flexibility and modularity for said radar system.

11. The radar system as defined in claim 10 wherein said first and second amplifiers each comprise first and second amplification stages.

12. A compact highly integrated radar system for detecting objects within a desired field by detecting the beat frequency shift and the amplitude from reflected signals from objects located therein, said system comprising:

transceiver means including a monolithic millimeter wave integrated circuit (MMIC) transceiver having a transmitter for transmitting a frequency modulated carrier signal and a receiver for receiving the reflected signals thereof, said MMIC transceiver including a circuit having a controlled oscillator means, amplification means, mixing means and duplexer means integrated onto a single monolithic chip;

antenna means including a microstrip patch antenna coupled to the transceiver means for transmitting and receiving said signals within a desired field;

processor means including a digital signal processor coupled to the transceiver means for analyzing the received signal to detect the presence of objects within the field; and control means for adjusting the dynamic range of the radar system.

13. The radar system as defined in claim 12 wherein said transmitter comprises:

a local voltage controlled oscillator for providing the frequency modulated carrier signal; and first amplifier means including a transmitter amplifier coupled to said oscillator for amplifying the frequency modulated carrier signal.

14. The radar system as defined in claim 13 wherein said receiver comprises:

second amplifier means including a receiver amplifier for amplifying the reflected signal received from said antenna means; and a balanced mixer coupled to said second amplifier means for receiving and mixing the reflected signals with a leakage signal representative of said carrier signal to provide an intermediate frequency by providing the difference between a reference transmit signal and said received signal.

15. The radar system as defined in claim 14 wherein said MMIC transceiver circuit further comprises:

a duplexer coupled between said transmitter and receiver for transmitting the carrier signal to the antenna and further transmitting received reflected signals from the antenna to the receiver and being adapted to provide isolation between said transmitter and receiver; and a coupler being adapted to couple the transmitter and receiver to the antenna and further adapted to provide a reference transmit signal to the balanced mixer via a leakage path.

16. The radar system as defined in claim 15 wherein said control means comprises:

an automatic gain control amplifier being adapted to receive an analog gain control signal from said digital signal processor and provide an output therefrom;

an analog-to-digital converter adapted to digitize the output of said automatic gain control amplifier and provide a digital signal to said digital signal processor; and a digital-to-analog converter being adapted to receive a digital gain control signal from the digital signal processor and provide the analog gain control signal.

17. A highly integrated radar system for detecting objects within a desired field, said system comprising:

transceiver means including a monolithic millimeter wave integrated circuit (MMIC) transceiver integrated on a single monolithic chip and having a circuit including an oscillator, at least one amplifier, a duplexer and a mixer and providing a transmitter for transmitting a frequency modulated (FM) carrier signal and a receiver for receiving reflected signals thereof;

antenna means including a microstrip patch antenna coupled to said transceiver means for transmitting said FM carrier signal and receiving said reflected signals within a desired field;

processor means including a digital signal processor coupled to said transceiver means for analyzing said received signals so as to detect the presence of objects within the desired field;

control means for providing dynamic range control of said radar system; and a compact low profile housing for enclosing said radar system, wherein said transceiver means, antenna means, processor means and control means are highly integrated within said housing.

* * * * *